Patented Oct. 16, 1934

1,977,525

UNITED STATES PATENT OFFICE 1,977,525

MANUFACTURE OF ADENOSINE PHOSPHORIC ACID

Pawel Edward Ostern, Lwów, Poland, assignor to Chemische und Pharmazeutische Fabrik Dr. Georg Henning, Berlin-Tempelhof, Germany No Drawing. Application August 2, 1933, Serial No. 683,405. In Germany August 2, 1932

5 Claims. (Cl. 260—9)

This invention relates to the manufacture of the therapeutically valuable adenosine phosphoric acid from animal substances, such as blood, muscle and the like, and has for its main object to provide for a method, which enables the technical manufacture of this acid with good yields.

A further object of the invention is to provide for a method, which enables the separation of adenosine phosphoric acid from inosinic acid, which is a decomposition product of adenosine phosphoric acid and always present in the raw or intermediate products used for or obtained in the manufacture of adenosine phosphoric acid from animal substances.

A further object of the invention is to provide for a method of making adenosine phosphoric acid from animal substances, in which the necessary removal of albumen from the raw materials or intermediate products is carried out with simple and inexpensive means.

With these and other objects in view the invention consists broadly speaking in a method for separating inosnic acid from adenosine phosphoric acid by converting a mixture of these acids into a mixture of their earth alkali metal salts and subjecting said mixture to fractional crystallization. The invention especially consists in the application of this method in the manufacture of adenosine phosphoric acid from animal substances, such as muscle, blood and the like in combination with a new and advantageous method for making a purified solution of these acids from the animal substances used as starting material which is described in the following examples and which has as characteristic features a partial and simple dealbumination of an aqueous extract made from the starting material and the removal of inorganic phosphates from the dealbuminated extract, before the separation of the inosinic acid from the adenosine phosphoric acid.

Examples (1) 10 kg. of fresh horse muscles are boiled for some minutes with about 10 kg. of water. Acetic acid is added to the boiling mixture in such amounts, that acid reaction against litmus is obtained. Then sodium hydroxide is added to the boiling mixture in such amounts, that a weakly alkaline reaction against litmus is obtained. Finally acetic acid is added drop by drop to the boiling mixture, until it reacts weakly acid. The pasty reaction mixture is cooled and then pressed out, thereby obtaining a liquid, which is free from the greatest part of albumen originally present in the starting material. Baryta water is added to the dealbuminated liquid obtained, until no more precipitation of barium phosphate takes place. The barium phosphate is separated from the liquid, which is now free from inorganic phosphates. The liquid obtained contains a mixture of barium salts of inosinic and adenosine phosphoric acid, which can be separated by fractional crystallization.

It is, however, preferable to subject the solution of the barium salts of the two acids to a purification treatment before the fractional crystallization. For this purpose the solution is neutralized with acetic acid and lead acetate solution is added, until the precipitation stops. The precipitate, which contains lead compounds of inosinic and adenosine phosphoric acid, is suspended in water and decomposed by treatment with hydrogen sulfide. The lead sulfide produced is separated from the solution, which is neutralized with barium carbonate, concentrated by evaporation under reduced pressure, filtered and subjected to crystallization in an ice box. The precipitate of crystalline barium salt of inosinic acid is separated from the mother liquor, from which the barium salt of adenosine phosphoric may be obtained by crystallization.

It is, however, of advantage to purify this mother liquor before crystallization. For this purpose mercury acetate is added, until the precipitation stops. The light yellow precipitate is suspended in water and decomposed with hydrogen sulfide. The mercury sulfide is separated from the liquid, which is concentrated by evaporation under reduced pressure. The concentrate is treated with diluted sulfuric acid to precipitate the barium as sulfate, which is separated from the solution by filtration. Ethyl alcohol of 96% strength is added to the filtrate, until it has a milky and turbid appearance. By crystallization in an ice box white needles of adenosine phosphoric acid are obtained which may be purified by recrystallization with aqueous ethyl alcohol. The yield in adenosine phosphoric acid amounts to 3 g.

(2) 50 kg. of cooled fresh blood of pigs are hæmolized with ammonia or saponine and then introduced into 50 kg. of boiling water containing a small amount of acetic acid. The mixture is boiled, weakly acidified by addition of acetic acid while boiling, made weakly alkaline by addition of sodium hydroxide while boiling and then acidified again by addition of acetic acid until the reaction is weakly acid. The blood pigment is precipitated by this treatment. The solid substances are separated from the liquid, which is treated in the same manner as described in Example 1. The yield of adenosine phosphoric acid is about 2 g.

(3) 10 kg. of fresh hearts of cattle are treated in the same manner as described in Example 1. The yield of adenosine phosphoric acid is about 2 g.

In the examples potassium hydroxide may be used instead of sodium hydroxide. The barium compounds employed may be replaced by corresponding calcium or strontium compounds.

The foregoing detailed examples have been given for clearness of understanding only, and no unnecessary limitations should be understood therefrom, but the appended claims should be construed as broadly as permissible in view of the prior art.

I claim:

1. A method for separating inosinic acid from adenosine phosphoric acid which consists in converting a mixture of said acids into a mixture of their earth alkali metal salts and separating the earth alkali metal salts of the acids by fractional crystallization.

2. A method for isolating adenosine phosphoric acid from animal substances, containing said acid, which consists in making an aqueous extract of said animal substances, removing the greater part of albumen from said aqueous extract, adding earth alkali metal compounds to said dealbuminated extract to precipitate the inorganic phosphates present in said extract and to convert the inosinic acid and the adenosine phosphoric acid present in said extract into their earth alkali metal salts, separating the precipitate from the liquid and separating the earth alkali metal salts of inosinic acid and adenosine phosphoric acid present in said liquid by fractional crystallization.

3. A method for isolating adenosine phosphoric acid from animal substances, containing said acid, which consists in boiling said animal substances with water, acidifying said boiling aqueous mixture with acetic acid, adding such amounts of alkali metal hydroxide to said boiling acidified aqueous mixture that it reacts faintly alkaline, adding such amounts of acetic acid to said faintly alkaline reacting reaction mixture that it reacts weakly acid, separating the solid substances from the liquid of said weakly acid reaction mixture, adding earth alkali metal hydroxides to said liquid to precipitate the inorganic phosphates present in said liquid and to convert the inosinic acid and the adenosine phosphoric acid present in said liquid into their earth alkali metal salts, separating the precipitate from the liquid and separating the earth alkali metal salts of inosinic acid and adenosine phosphoric acid present in said liquid by fractional crystallization.

4. A method for isolating adenosine phosphoric acid from animal substances, containing said acid, which consists in boiling said animal substances with water, acidifying said boiling aqueous mixture with acetic acid, adding such amounts of alkali metal hydroxide to said boiling acidified aqueous mixture that it reacts faintly alkaline, adding such amounts of acetic acid to said faintly alkaline reacting reaction mixture that it reacts weakly acid, separating the solid substances from the liquid of said weakly acid reaction mixture, adding earth alkali metal hydroxides to said liquid to precipitate the inorganic phosphates present in said liquid and to convert the inosinic acid and the adenosine phosphoric acid present in said liquid into their earth alkali metal salts, separating the precipitate from the liquid, treating said liquid with lead acetate, separating the precipitate obtained by said lead acetate treatment, decomposing said precipitate by treatment with hydrogen sulfide in presence of water, separating the liquid from the precipitated lead sulfide, neutralizing said liquid with earth alkali metal compounds and separating the earth alkali metal salt of inosinic acid from the earth alkali metal salt of adenosine phosphoric acid, both present in said liquid, by fractional crystallization.

5. A method for isolating adenosine phosphoric acid from animal substances, containing said acid, which consists in boiling said animal substances with water, acidifying said boiling aqueous mixture with acetic acid, adding such amounts of alkali metal hydroxide to said boiling acidified aqueous mixture that it reacts faintly alkaline, adding such amounts of acetic acid to said faintly alkaline reacting reaction mixture that it reacts weakly acid, separating the solid substances from the liquid of said weakly acid reaction mixture, adding earth alkali metal hydroxides to said liquid to precipitate the inorganic phosphates present in said liquid and to convert the inosinic acid and the adenosine phosphoric acid present in said liquid into their earth alkali metal salts, separating the precipitate from the liquid, treating said liquid with lead acetate, separating the precipitate obtained by said lead acetate treatment, decomposing said precipitate by treatment with hydrogen sulfide in presence of water, separating the liquid from the precipitated lead sulfide, neutralizing said liquid with earth alkali metal compounds, separating the earth alkali metal salt of inosinic acid from the earth alkali metal salt of adenosine phosphoric acid, both present in said liquid, by fractional crystallization, adding mercury acetate to the solution of earth alkali metal salt of adenosine phosphoric acid obtained by fractional crystallization, separating the precipitate from the liquid, decomposing the precipitate with hydrogen sulfide in presence of water, separating the mercury sulfide from the liquid and recovering the adenosine phosphoric acid from said liquid by crystallization.

PAWEL EDWARD OSTERN.